United States Patent [19]

Shiomi et al.

[11] Patent Number: 5,648,117
[45] Date of Patent: Jul. 15, 1997

[54] POWDER COATING COMPOSITION

[75] Inventors: Yasushi Shiomi; Akimitsu Uenaka, both of Suita; Koichi Tsutsui, Kyoto, all of Japan

[73] Assignee: Nippon Paint Co., Ltd., Osaka, Japan

[21] Appl. No.: 480,324

[22] Filed: Jun. 7, 1995

Related U.S. Application Data

[62] Division of Ser. No. 331,956, Oct. 31, 1994, Pat. No. 5,523,349.

[30] Foreign Application Priority Data

Nov. 8, 1993 [JP] Japan ................. 5-278582

[51] Int. Cl.$^6$ ........................................ B05D 3/02
[52] U.S. Cl. ......................... 427/195; 427/388.1
[58] Field of Search ...................... 427/195, 410, 427/386, 385.5, 388.1

[56] References Cited

U.S. PATENT DOCUMENTS

| | | | |
|---|---|---|---|
| 3,989,767 | 11/1976 | Homma et al. | 260/834 |
| 4,023,977 | 5/1977 | Mercurio | 106/178 |
| 4,042,560 | 8/1977 | Peng | 260/42.28 |
| 4,069,274 | 1/1978 | Shibata et al. | 260/836 |
| 4,091,049 | 5/1978 | Labana et al. | 260/836 |
| 4,499,239 | 2/1985 | Murakami et al. | 525/111 |
| 4,812,335 | 3/1989 | Kuwajima et al. | 427/409 |
| 4,812,516 | 3/1989 | Maeda | 525/83 |
| 4,975,475 | 12/1990 | Tsuchiya et al. | 523/411 |
| 5,397,641 | 3/1995 | Moens et al. | 427/421 |
| 5,407,707 | 4/1995 | Simeone et al. | 427/195 |
| 5,453,295 | 9/1995 | Sammel et al. | 427/386 |
| 5,523,349 | 6/1996 | Shiomi et al. | 525/108 |
| 5,585,146 | 12/1996 | Uenaka et al. | 427/407.1 |

*Primary Examiner*—Diana Dudash
*Attorney, Agent, or Firm*—Townsend & Banta

[57] ABSTRACT

A powder coating composition contains acrylic resin (A) containing at least 40 percent by weight of a glycidyl-group-containing monomer and having a solubility parameter which is in the range of 11.0 to 11.6 and a glass transition temperature of at least 20° C., a surface modifier (B) consisting of a polymer having a solubility parameter which is in the range of 10.4 to 11.0, and polyvalent carboxylic acid (B). The surface modifier (B) is in a content of 0.1 to 4 parts by weight with respect to a total content of 100 parts by weight of the acrylic resin (A) and the polyvalent carboxylic acid (C), while the components are so mixed with each other that the amount of carboxylic groups contained in the polyvalent carboxylic acid (C) is at an equivalence ratio of at least 0.5 to the amount of glycidyl groups contained in the acrylic resin (A).

8 Claims, No Drawings

POWDER COATING COMPOSITION

CROSS REFERENCE TO A RELATED APPLICATIONS

This is a divisional application of application Ser. No. 08/331,956 filed Oct. 31, 1994, now U.S. Pat. No. 5,523,349.

BACKGROUND OF THE INVENTION

1. Field of the Invention

The present invention relates to a powder coating composition which is employed for coating an automobile, a building material or a metal product.

2. Description of the Background Art

Acrylic resin powder coating material is watched with interest in view of the excellent appearance of a coating film as formed, weather resistance, solvent resistance, flexibility and the like. Powder coating material which is applied to clear coating or the like is known as an acrylic resin powder coating material. For example, each of Japanese Patent Publication Nos. 53-15089 (1978), 58-4947 (1983) and 58-25388 (1983) discloses acrylic resin powder coating material prepared from acrylic resin containing glycidyl groups, which is heat-cured after coating.

Such acrylic resin powder coating material is baked at a temperature of 160° to 180° C. after coating, while it is desired that a coating film can be formed by baking the coating material at a lower temperature of 130° to 160° C., for example, in consideration of productivity and energy saving. When conventional acrylic resin powder coating material is baked at such a low temperature, however, the appearance of the coating film is deteriorated with reduction in weather resistance and blocking resistance. While it may be possible to add a curing catalyst to the coating material for facilitating curing at a low temperature, storage stability is deteriorated in this case.

SUMMARY OF THE INVENTION

An object of the present invention is to provide a powder coating composition, which can be baked at a low temperature, enabling for providing a coating film which is excellent in appearance, weather resistance and blocking resistance.

The powder coating composition according to the present invention contains acrylic resin (A) containing at least 40 percent by weight of glycidyl-group-containing monomer and having a solubility parameter which is in the range of 11.0 to 11.6 and a glass transition temperature of at least 20° C., a surface modifier (B) consisting of a polymer having a solubility parameter which is in the range of 10.4 to 11.0, and polyvalent carboxylic acid (C). These components are mixed with each other that the powder coating composition contains 0.1 to 4 parts by weight of the surface modifier (B) with respect to a total content of 100 parts by weight of the acrylic resin (A) and the polyvalent carboxylic acid (C) and the amount of the carboxyl groups contained in the polyvalent carboxylic acid (C) is at least 0.5 in an equivalent ratio to the amount of glycidyl groups contained in the acrylic resin (A).

Acrylic Resin (A)

The acrylic resin (A) employed in the present invention contains at least 40 percent by weight, preferably 40 to 65 percent by weight of the glycidyl-group-containing monomer. If the content of the glycidyl-group-containing monomer is less than 40 percent by weight, the effect of low-temperature curing according to the present invention is not attained. If the content of the glycidyl-group-containing monomer exceeds 65 percent by weight, on the other hand, the coating film as formed is reduced in transparency, with a tendency to have an inferior appearance. The content of the glycidyl-group-containing monomer is more preferably 43 to 62 percent by weight, and further preferably 45 to 60 percent.

The glycidyl-group-containing monomer employed in the present invention can be prepared from an ethylenic unsaturated bond monomer containing a glycidyl group such as glycidyl acrylate, glycidyl methacrylate, α-methylglycidyl acrylate or α-methylglycidyl methacrylate, for example. Two or more such monomers may be mixed with each other for preparing the glycidyl-group-containing monomer.

Exemplary monomers which can be copolymerized with the glycidyl-group-containing monomer are, for example, alkylesters of acrylic acid or methacrylic acid such as methyl acrylate, ethyl acrylate, n-butyl acrylate, i-butyl acrylate, t-butyl acrylate, 2-ethylhexyl acrylate, cyclohexyl acrylate, methyl methacrylate, ethyl methacrylate, n-butyl methacrylate, i-butyl methacrylate, t-butyl methacrylate, 2-ethylhexyl methacrylate, lauryl methacrylate, tridecyl methacrylate, stearyl methacrylate and cyclohexyl methacrylate; styrene, vinyltoluene, α-methylstyrene, acrylonitrile, methacrylonitrile, acrylamide and dimethylacrylamide; hydroxyalkylesters of acrylic acid or methacrylic acid such as hydroxyethyl acrylate, hydroxypropyl acrylate, hydroxyethyl methacrylate and hydroxypropyl methacrylate; and dialkylesters of unsaturated dibasic acid.

It is particularly preferable that the acrylic resin (A) contains 0.1 to 10 percent by weight of i-butyl methacrylate as a monomer component which is copolymerized with the glycidyl-group-containing monomer, in consideration of blocking resistance.

According to the present invention, the acrylic resin (A) has a solubility parameter which is in the range of 11.0 to 11.6. Due to such a solubility parameter of the acrylic resin (A), the powder coating composition can be cured at a low temperature, and it is possible to obtain a coating film having excellent transparency. The solubility parameter can be measured by a method utilizing turbidimetric titration which is described in Suh, Clarke, J. Polym., Sci., A-1, 5, 1671–1681 (1967), under a measuring temperature of 20° C. with a solvent of tetrahydrofluran (THF). According to the present invention, the solubility parameter of the acrylic resin (A) is more preferably in the range of 11.0 to 11.4.

The acrylic resin (A) employed in the present invention has a glass transition temperature of at least 20° C. If the glass transition temperature is lower than 20° C., blocking resistance of the powder coating composition is reduced. The glass transition temperature of the acrylic resin (A) employed in the present invention is preferably 20° to 60° C., more preferably 35° to 58° C. If the glass transition temperature is excessively increased, the coating film tends to have an inferior appearance.

Surface Modifier (B)

The surface modifier (B) employed in the present invention has a solubility parameter which is in the range of 10.4 to 11.0. Due to such a solubility parameter of the surface modifier (B), compatibility with the acrylic resin (A) is improved so that the coating film as formed has excellent transparency. The solubility parameter of the surface modifier (B) is more preferably in the range of 10.6 to 10.9. This solubility parameter can be measured similarly to that of the acrylic resin (A).

The number average molecular weight of the surface modifier (B) is preferably in the range of 2500 to 9000, more preferably in the range of 3000 to 7000. If the molecular weight of the surface modifier (S) is excessively reduced, blocking resistance is so reduced that a sufficient surface modifying effect cannot be attained. If the molecular weight of the surface modifier (B) is excessively increased, on the other hand, smoothness of the coating film is deteriorated.

The content of the surface modifier (B) is 0.1 to 4 parts by weight with respect to a total content of 100 parts by weight of the acrylic resin (A) and the polyvalent carboxylic acid (C). If the content of the surface modifier (B) is too small, smoothness of the coating film is deteriorated. If the content of the surface modifier (B) is too large, on the other hand, blocking resistance is reduced.

A polymer for preparing the surface modifier (B) is not particularly restricted so far as the same has the aforementioned solubility parameter and number average molecular weight, while the same can preferably be prepared from acrylic polymers. Exemplary monomers for forming such acrylic polymers are alkylesters of acrylic acid or methacrylic acid such as methyl acrylate, ethyl acrylate, n-butyl acrylate, i-butyl acrylate, t-butyl acrylate, 2-ethylhexyl acrylate, cyclohexyl acrylate, methyl methacrylate, ethyl methacrylate, n-butyl methacrylate, i-butyl methacrylate, t-butyl methacrylate, stearyl methacrylate and lauryl methacrylate. It is possible to employ a polymer which is obtained by polymerizing one, two or more such monomers.

Polyvalent Carboxylic Acid (C)

The polyvalent carboxylic acid (C) employed in the present invention is adapted to cause ring-opening addition reaction of the glycidyl groups contained in the acrylic resin (A), thereby heat-curing the coating film. Such polyvalent carboxylic acid (C) is so blended that the amount of the carboxylic groups contained therein is at an equivalence ratio of at least 0.5, preferably 0.6 to 0.8 to that of the glycidyl groups contained in the acrylic resin (A). Heat-curability of the powder coating composition is reduced if the content of the carboxylic groups is too small, while glossiness of the coating film is reduced if the content is too large.

The polyvalent carboxylic acid (C) employed in the present invention can be prepared from aliphatic dibasic acids such as adipic acid, sebacic acid, azelaic acid, decane dicarboxylic acid, hexadecane dicarboxylic acid, icosane dicarboxylic acid, and tetraicosane dicarboxylic acid; aromatic polyvalent carboxylic acids such as isophthalic acid and trimellitic acid; and alicyclic dibasic acids such as hexahydrophthalic acid and tetrahydrophthalic acid, for example. Among these acids, decane dicarboxylic acid is particularly preferable.

The inventive powder coating composition preferably further contains epoxy resin. It is possible to improve adhesion between the coating film and the coated surface, thereby improving primary adhesion, water resistance and adhesion after a moisture resistance test. The content of the epoxy resin is preferably 0.5 to 5.0 percent by weight with respect to the total content of the acrylic resin (A), the surface modifier (B) and the polyvalent carboxylic acid (C). The effect of improving adhesion is insufficient if the content of the epoxy resin is too small, while an effect corresponding to the content cannot be expected and this leads to an economical disadvantage if the content is too large.

The epoxy resin employed in the present invention is not particularly restricted so far as the same contains at least two epoxy groups in its molecules, while epoxy resins which are generally employed for coating material, such as epichlorohydrin-bisphenol condensates and triglycidyl isocyanurate, can be employed.

The inventive powder coating composition can further contain an ultraviolet absorbent and/or a hindered amine light stabilizer (HALS). It is possible to improve weather resistance of the coating film by introducing the ultraviolet absorbent and/or the hindered amine light stabilizer into the powder coating composition. Thus, it is possible to prevent yellowing and to improve adhesion after a weathering test. Each of the ultraviolet absorbent and the hindered amine light stabilizer is preferably in the content of 0.1 to 7 percent by weight with respect to the total content of the acrylic resin (A), the surface modifier (B) and the polyvalent carboxylic acid (C). The effect of improving weather resistance is insufficient if the content of the ultraviolet absorbent or the hindered amine light stabilizer is too small, while no effect corresponding to the content can be attained and this leads to an economical disadvantage if the content is too large.

The ultraviolet absorbent can be prepared from general ones such as salicylate, benzophenone, benzotriazole and oxalic anilide ultraviolet absorbents.

Generally known examples of the salicylate ultraviolet absorbents are phenyl salicylate, 4-t-butylphenyl salicylate and 4-t-octylphenyl salicylate.

Generally known examples of the benzophenone ultraviolet absorbents are 2,4-dihydroxybenzophenone, 2-hydroxy-4-methoxybenzophenone, 2-hydroxy-4-methoxybenzophenone-5-sulfonic acid, 2-hydroxy-4-n-octoxybenzophenone, 2-hydroxy-4-n-dodecyloxybenzophenone, 2-hydroxy-4-benzyloxy-benzophenone, bis(5-benzoyl-4-hydroxy-2-methoxyphenyl) methane, 2,2'-dihydroxy-4-methoxybenzophenone, 2,2'-dihydroxy-4,4'-dimethoxybenzophenone, a mixture of 2,2'-dihydroxy-4,4'-dimethoxybenzophenone and another 4-substituted benzophenone such as "UVINUL490" (trade name) by BASF Ltd., for example, 2,2',4,4'-tetrahydroxybenzophenone, and 2-hydroxy-4-methoxy-2'-carboxylbenzophenone.

Generally known examples of the benzotriazole ultraviolet absorbents are 2-(2'-hydroxy-5'-methylphenyl) benzotriazole, 2-[2'-hydroxy-3'-5'-bis(α,α-dimethylbenzyl) phenyl]-benzotriazole, 2-(2'-hydroxy-3',5'-di-t-butylphenyl)-benzotriazole, 2-(2'-hydroxy-3'-t-butyl-5'-methylphenyl)-5-chlorobenzotriazole, 2-(2'-hydroxy-3',5-di-t-butylphenyl)-5-chlorobenzotriazole, 2-(2'-hydroxy-3', 5'-di-t-amyl-benzotriazole, 2-(2'-hydroxy-5'-t-octylphenyl) benzotriazole, and 2,2'-methylenebis[4-(1,1,3,3,-tetramethylbutyl)-6-(2N-benzotriazole-2-yl) phenol].

An exemplary commercial product of the benzophenone ultraviolet absorbents is "Seesorb 103" by Shipuro Kasei Co., Ltd., and exemplary commercial items of the benzotriazole ultraviolet absorbent are "Tinuvin 900", "Tinuvin 320" and "Tinuvin 328" by Chiba-Geigy Ltd., while an exemplary commercial product of the oxalic anilide ultraviolet absorbents is "Sanduvor" by Sandoz Co., Ltd.

Generally known examples of the hindered amine light stabilizers are bis(2,2,6,6-tetramethyl-4-piperidyl) sebacate, tetrakis (2,2,6,6-tetramethyl-4-piperidyl)-1,2,3,4-butanetetracarboxylate, and 2,4,-dichloro-6-(1,1,3,3-tetramethylbutylamino)-1,3,5-triazine N,N'-bis(2,2,6,6-tetramethyl-4-piperidyl) hexamethylenediamine polycondensate.

Exemplary commercial products of the hindered amine light stabilizer are "Sanol LS770" and "Sanol LS-440" by Sankyo Co., Ltd. and "Tinuvin 123" by Chiba-Geigy Ltd.

According to the inventive powder coating composition, it is possible to obtain a coating film which can be cured at a low temperature and is excellent in appearance such as transparency, weather resistance, blocking resistance and the like.

A surface coated by the inventive powder coating composition, which is not particularly restricted, can be prepared from various materials such as steel plate, zinc phospate treated steel plate, aluminum plate, or coating. The inventive powder coating composition may be applied to an undercoating film formed by a base coat in the manner of wet on wet and then baked simultaneously. In particular, the improvement of adhesion attained by the aforementioned epoxy resin and the improvement of weather resistance attained by the ultraviolet absorbent and the hindered amine light stabilizer are effective for coating an aluminum material.

The inventive powder coating composition preferably has a volume average particle size of 5 to 50 μm, more preferably 8 to 40 μm. When the average particle size is in the range of 5 to 20 μm, particles of not more than 5 μm in size are preferably at a rate of not more than 25 percent by weight. When the average particle size is in the range of 20 to 50 μm, on the other hand, standard deviation of particle size distribution is preferably not more than 20 μm. The standard deviation of particle size distribution is expressed in $[\Sigma\{(D-X)^2 F\}/\Sigma F]^{1/2}$, where D represents the size of each particle, X represents a volume average particle size of $\Sigma(DF)/\Sigma F$, and F represents the frequency of the particles.

The acrylic resin (A) employed as a main component of the inventive powder coating composition contains at least 40 percent by weight of a glycidyl-group-containing monomer, and has a solubility parameter which is in the range of 11.0 to 11.6. While a conventional acrylic resin powder coating material contains not more than 30 percent by weight of a glycidyl-group-containing monomer, the inventive powder coating composition contains a larger amount of the Glycidyl-group-containing monomer. Thus, it is possible to heat-cured the inventive powder coating composition at a low temperature of about 130° to 160° C., for example, thereby enabling low-temperature baking. Further, a coating material having excellent blocking resistance can be obtained due to the glass transition temperature of at least 20° C.

In the inventive powder coating composition, the surface modifier (B) consisting of a polymer having a solubility parameter which is in the range of 10.4 to 11.0 is employed in a proper amount, whereby compatibility with the acrylic resin (A) is so improved that the coating film has excellent transparency.

Thus, the inventive powder coating composition can be cured at a low temperature, and is capable of providing a coating film which is excellent in appearance such as transparency, weather resistance, blocking resistance and the like.

The foregoing and other objects, features, aspects and advantages of the present invention will become more apparent from the following detailed description of the present invention.

DESCRIPTION OF THE PREFERRED EMBODIMENTS

Examples 1 to 13 and Comparative Examples 1 to 11

Samples A-1 to A-13 of acrylic resin (A) having solubility parameters (SP values) and glass transition temperatures (Tg) shown in Table 1 were prepared. The sample A-13 was prepared from a commercially available acrylic resin (PD-7690 (trade name) by Mitsui Toatsu Chemicals, Inc.). The glycidyl contents are those of glycidyl methacrylate (GMA), except the sample A-2. The sample A-2 contained 40 percent by weight of glycidyl methacrylate, and 5 percent by weight of α-methylglycidyl methacrylate (α-MGM). Each of the samples A-1 to A-4 and A-6 to A-12 contained 8 percent by weight of i-butyl methacrylate (i-BMA) as a copolymerized monomer component. Each of the samples A-1 to A-12 contained styrene and methyl methacrylate as other monomer components, while each of the samples A-4, A-5, A-7, A-8, A-9 and A-12 further contained n-butyl methacrylate, and the sample A-11 further contained 2-hydroxyethyl methacrylate.

Samples B-1 to B-8 of a surface modifier (B) having SP values and number average molecular weights shown in Table 2 were prepared. The sample B-8 was prepared from a commercially available acrylic resin (Resimix RL-4 (trade name) by Mitsui Toatsu Chemicals, Inc.). Each of the samples B-1 to B-7 was prepared with ethyl acrylate and n-butyl acrylate serving as monomer components.

1,10-decane dicarboxylic acid serving as polyvalent carboxylic acid (C) was mixed with polysiloxane (CF-1056 (trade name) by Toray Dow Corning Co., Ltd.), benzoin and bisphenol A type epoxy resin (YD-012 (trade name) by Tohto Kasei Co., Ltd.) in blending ratios shown in Tables 3 and 4, so that the mixtures as obtained were melted and kneaded in a Buss co-kneader (by Buss Co., Ltd.), crushed and classified into 150 meshes, thereby preparing powder coating materials.

The powder coating materials as obtained were electrostatically coated by an electrostatic coating apparatus by Sames Co., Ltd. on steel plates of 0.8 mm in thickness which were treated with zinc phosphate, and baked under conditions of 150° C. for 25 minutes.

As to coating films and coating materials as obtained, xylol resistance, smoothness and glossiness, transparency, and blocking resistance were evaluated as follows:

Xylol Resistance: A lapping test was made with xylol, with visual evaluation of appearances.

Smoothness and Glossiness: Smoothness and glossiness of the surfaces of the coating films were visually evaluated. Referring to Tables 5 and 6, o and × show superior and inferior results respectively.

Transparency: The coating materials were applied to glass plates, for visual evaluation of transparency. Refering to Tables 5 and 6, o and × show superior and inferior results respectively.

Blocking Resistance: The coating materials were introduced into sample bottles of 50 ml, left at 30° C. for 2 months and thereafter taken out for evaluation of aggregate states. Referring to Tables 5 and 6, o and × show superior and inferior results respectively.

Comparing Tables 5 and 6, it is clearly understood that it is possible to obtain a coating film having excellent xylol resistance also in low-temperature baking at 150° C. for 25 minutes with excellent smoothness, glossiness, transparency and blocking resistance according to the present invention, as it is obvious from the results of the powder coating materials according to Examples 1 to 13.

Examples 14 to 17

Aluminum plates to be coated were prepared by cutting surfaces of castings having thicknesses of 1 cm, degreasing the same with alkaline degreaser ("Surfcleaner" (trade name) by Nippon Paint Co., Ltd.) and thereafter treating the same with chromium acid treating agent ("Alsurf" (trade name) by Nippon Paint Co., Ltd.).

As shown in Table 7, the acrylic resin (A) was prepared from the sample A-1, and the surface modifier (B) was prepared from the sample B-1. Polysiloxane, benzoin and epoxy resin were similar to those employed in Examples 1 to 3. Ultraviolet absorbent was prepared from "Tinuvin 320" by Chiba-Geigy Ltd., and hindered amine light stabilizer was prepared from "Sanol LS-770" by Sankyo Co., Ltd.

Powder coating materials having compositions shown in Table 7 were applied onto the aluminum plates and baked. A baking furnace was set at a temperature of 160° C. before receiving the samples, and then set at a temperature of 150° C. after receiving the samples, for baking the same at 150° C. for 25 minutes.

A moisture resistance test and a weathering test were made on the samples as follows:

<Moisture Resistance Test>

Each sample was left under conditions of 95% RH and 50° C. for 10 days, and thereafter provided with a grid pattern having 100 blocks at intervals of 2 mm by a sharp cutter so that cut portions reach the aluminum plate serving as a substrate. An adhesive tape was applied to the grid pattern and then separated, for evaluating adhesion of each coating film by counting the number of the blocks remaining on the coated aluminum plate.

<Weathering Test>

A weatherometer was employed for evaluating yellowed states of the coating films after 600 hours as follows:

⊚: unchanged

○: substantially unchanged

○-Δ: extremely slightly colored

Δ: slightly colored

×: considerably colored

Table 7 shows the results of the moisture resistance test and the weathering test.

As shown in Table 7, each of Examples 15 to 17 blended with epoxy resin exhibited excellent adhesion. While weather resistance is slightly reduced by blending epoxy resin as understood from comparison between Examples 14 and 17, it is possible to improve the weather resistance by adding the ultraviolet absorbent and the hindered amine light stabilizer, as understood from Examples 15 and 16.

Examples 18 to 19

Zinc-phosphate-treated steel plates employed in Examples 1 to 13 were coated by electrodeposition paint ("Powertop U-30" (trade name) by Nippon Paint Co., Ltd.) and alkyd resin intermediate paint ("Orga P-2" (trade name) by Nippon Paint Co., Ltd.), and thereafter coated by acrylic resin waterborne paint ("Supernics M230 (trade name) by Nippon Paint Co., Ltd.) and heated at 100° C. for 5 minutes. Thereafter, the powder coatings of Examples 18 and 19 shown in Table 7 were applied onto the coating films formed from the acrylic resin water-borne paint and then baked at 150° C. for 25 minutes.

The moisture resistance test and the weathering test were conducted on the obtained samples similarly to Examples 14 to 17.

As shown in Table 7, Example 18, in which the powder coating was applied onto acrylic resin water-borne coating film, exhibited excellent adhesion and water resistance. Example 19 containing the ultraviolet absorbent and the hindered amine light stabilizer exhibited more excellent water resistance.

Although the present invention has been described and illustrated in detail, it is clearly understood that the same is by way of illustration and example only and is not to be taken by way of limitation, the spirit and scope of the present invention being limited only by the terms of the appended claims.

TABLE 1

| Acrylic Resin (A) | A-1 | A-2 | A-3 | A-4 | A-5 | A-6 | A-7 | A-8 | A-9 | A-10 | A-11 | A-12 | A-13* |
|---|---|---|---|---|---|---|---|---|---|---|---|---|---|
| SP Value | 11.3 | 11.3 | 11.3 | 11.3 | 11.3 | 11.5 | 11.3 | 11.3 | 11.3 | 11.3 | 12.0 | 11.1 | 11.0 |
| Tg (°C.) | 52 | 52 | 52 | 52 | 52 | 52 | 30 | 48 | 52 | 38 | 52 | 15 | 55 |
| Glycidyl Content (wt. %) | 45 | 45 | 60 | 40 | 45 | 45 | 45 | 45 | 30 | 70 | 45 | 45 | 30 |

*Acrylic Resin PD-7690 (Mitsui Toatsu Chemicals, Inc.)

TABLE 2

| Surface Modifier (B) | B-1 | B-2 | B-3 | B-4 | B-5 | B-6 | B-7 | B-8* |
|---|---|---|---|---|---|---|---|---|
| SP Value | 10.7 | 10.7 | 10.7 | 10.7 | 10.9 | 10.7 | 10.7 | 10.1 |
| Number Average Molecular Weight (Mn) | 6000 | 4000 | 3000 | 7000 | 6000 | 10000 | 2000 | 6000 |

*Resimix RL-4 (Mitsui Toatsu Chemicals, Inc.)

TABLE 3

| Example | 1 | 2 | 3 | 4 | 5 | 6 | 7 | 8 | 9 | 10 | 11 | 12 | 13 |
|---|---|---|---|---|---|---|---|---|---|---|---|---|---|
| Acrylic Resin (A) | A-1 315 | A-2 315 | A-3 315 | A-4 315 | A-5 315 | A-6 315 | A-7 315 | A-8 315 | A-1 315 | A-1 315 | A-1 315 | A-1 315 | A-1 315 |
| Surface | B-1 | B-1 | B-1 | B-1 | B-1 | B-1 | B-1 | B-1 | B-2 | B-3 | B-4 | B-5 | B-1 |

TABLE 3-continued

| Example | 1 | 2 | 3 | 4 | 5 | 6 | 7 | 8 | 9 | 10 | 11 | 12 | 13 |
|---|---|---|---|---|---|---|---|---|---|---|---|---|---|
| Modifier (B) | 2.4 | 2.4 | 2.4 | 2.4 | 2.4 | 2.4 | 2.4 | 2.4 | 2.4 | 2.4 | 2.4 | 2.4 | 2.3 |
| Decane Discarboxylic Acid (C) | 80.5 | 80.5 | 80.5 | 80.5 | 80.5 | 80.5 | 80.5 | 80.5 | 80.5 | 80.5 | 80.5 | 80.5 | 71.3 |
| Polysiloxane | 0.5 | 0.5 | 0.5 | 0.5 | 0.5 | 0.5 | 0.5 | 0.5 | 0.5 | 0.5 | 0.5 | 0.5 | 0.5 |
| Benzoin | 1.9 | 1.9 | 1.9 | 1.9 | 1.9 | 1.9 | 1.9 | 1.9 | 1.9 | 1.9 | 1.9 | 1.9 | 1.9 |
| Epoxy Resin | 14.4 | 14.4 | 14.4 | 14.4 | 14.4 | 14.4 | 14.4 | 14.4 | 14.4 | 14.4 | 14.4 | 14.4 | 14.4 |

TABLE 4

| Comparative Example | 1 | 2 | 3 | 4 | 5 | 6 | 7 | 8 | 9 | 10 | 11 |
|---|---|---|---|---|---|---|---|---|---|---|---|
| Acrylic Resin (A) | A-9 | A-13 | A-10 | A-11 | A-12 | A-1 | A-1 | A-1 | A-1 | A-1 | A-1 |
| | 315 | 315 | 315 | 315 | 315 | 315 | 315 | 315 | 315 | 315 | 315 |
| Surface Modifier (B) | B-1 | B-1 | B-1 | B-1 | B-1 | B-6 | B-7 | B-8 | B-1 | B-1 | B-1 |
| | 2.2 | 2.2 | 2.6 | 2.4 | 2.4 | 2.4 | 2.4 | 2.4 | 0.04 | 20 | 2.2 |
| Decane Discarboxylic Acid (C) | 53.7 | 53.7 | 125 | 80.5 | 80.5 | 80.5 | 80.5 | 80.5 | 80.5 | 80.5 | 57.5 |
| Polysiloxane | 0.5 | 0.5 | 0.5 | 0.5 | 0.5 | 0.5 | 0.5 | 0.5 | 0.5 | 0.5 | 0.5 |
| Benzoin | 1.9 | 1.9 | 1.9 | 1.9 | 1.9 | 1.9 | 1.9 | 1.9 | 1.9 | 1.9 | 1.9 |
| Epoxy Resin | 14.4 | 14.4 | 14.4 | 14.4 | 14.4 | 14.4 | 14.4 | 14.4 | 14.4 | 14.4 | 14.4 |

TABLE 5

| Example | 1 | 2 | 3 | 4 | 5 | 6 | 7 | 8 | 9 | 10 | 11 | 12 | 13 |
|---|---|---|---|---|---|---|---|---|---|---|---|---|---|
| (1) Type | A-1 | A-2 | A-3 | A-4 | A-5 | A-6 | A-7 | A-8 | A-1 | A-1 | A-1 | A-1 | A-1 |
| Glycidyl Species | GMA | α-MGM | GMA | GMA | GMA | GMA | GMA | GMA | GMA | GMA | GMA | GMA | GMA |
| Glycidyl Content | 45 | 45 | 60 | 40 | 45 | 45 | 45 | 45 | 45 | 45 | 45 | 45 | 45 |
| SP Value | 11.3 | 11.3 | 11.3 | 11.3 | 11.3 | 11.5 | 11.3 | 11.3 | 11.3 | 11.3 | 11.3 | 11.3 | 11.3 |
| Tg | 52 | 52 | 52 | 52 | 52 | 52 | 30 | 48 | 56 | 56 | 56 | 56 | 56 |
| (2) Type | B-1 | B-1 | B-1 | B-1 | B-1 | B-1 | B-1 | B-1 | B-2 | B-3 | B-4 | B-5 | B-1 |
| Molecular Weight (Mn) | 6000 | 6000 | 6000 | 6000 | 6000 | 6000 | 6000 | 6000 | 4000 | 3000 | 7000 | 6000 | 6000 |
| SP Value | 10.7 | 10.7 | 10.7 | 10.7 | 10.7 | 10.7 | 10.7 | 10.7 | 10.7 | 10.7 | 10.7 | 10.9 | 10.7 |
| (3) Content of Surface Modifier (B) (%) | 0.6 | 0.6 | 0.6 | 0.6 | 0.6 | 0.6 | 0.6 | 0.6 | 0.6 | 0.6 | 0.6 | 0.6 | 0.6 |
| (A)/(C) | 0.7 | 0.7 | 0.7 | 0.7 | 0.7 | 0.7 | 0.7 | 0.7 | 0.7 | 0.7 | 0.7 | 0.7 | 0.62 |
| (4) Xylene Resistance | ⊙ | ⊙ | ⊙ | ⊙ | ⊙ | ⊙ | ⊙ | ⊙ | ⊙ | ⊙ | ⊙ | ⊙ | ○ |
| Smoothnes | ⊙ | ⊙ | ⊙ | ⊙ | ⊙ | ⊙ | ⊙ | ⊙ | ⊙ | ⊙ | ⊙ | ⊙ | ⊙ |
| Transparency of Coating Film | ⊙ | ⊙ | ⊙ | ⊙ | ⊙ | ⊙ | ⊙ | ⊙ | ⊙ | ⊙ | ⊙ | ⊙ | ⊙ |
| Blocking Resistance | ⊙ | ⊙ | ⊙ | ⊙ | ○ | ⊙ | ○ | ⊙ | ⊙ | ○ | ⊙ | ⊙ | ⊙ |
| Glossines | ○ | ○ | ○ | ○ | ○ | ○ | ○ | ○ | ○ | ○ | ○ | ○ | ○ |

(1) Acrylic Resin (A)
(2) Surface Modifier (B)
(3) Blending Ratio
(4) Evaluation

TABLE 6

| Comparative Example | 1 | 2 | 3 | 4 | 5 | 6 | 7 | 8 | 9 | 10 | 11 |
|---|---|---|---|---|---|---|---|---|---|---|---|
| (1) Type | A-9 | A-13 | A-10 | A-11 | A-12 | A-1 | A-1 | A-1 | A-1 | A-1 | A-1 |
| Glycidyl Species | GMA | GMA | GMA | GMA | GMA | GMA | GMA | GMA | GMA | GMA | GMA |
| Glysidyl Content | 30 | 30 | 70 | 45 | 45 | 45 | 45 | 45 | 45 | 45 | 45 |
| SP Value | 11.3 | 11.0 | 11.3 | 12.0 | 11.1 | 11.3 | 11.3 | 11.3 | 11.3 | 11.3 | 11.3 |
| Tg | 52 | 55 | 38 | 52 | 15 | 52 | 52 | 52 | 52 | 52 | 52 |
| (2) Type | B-1 | B-1 | B-1 | B-1 | B-1 | B-6 | B-7 | B-8 | B-1 | B-1 | B-1 |
| Molecular Weight (Mn) | 6000 | 6000 | 6000 | 6000 | 6000 | 10000 | 2000 | 6000 | 6000 | 6000 | 6000 |
| SP Value | 10.7 | 10.7 | 10.7 | 10.7 | 10.7 | 10.7 | 10.7 | 10.7 | 10.7 | 10.7 | 10.7 |
| (3) Content of Surface Modifier(B) (%) | 0.6 | 0.6 | 0.6 | 0.6 | 0.6 | 0.6 | 0.6 | 0.6 | 0.01 | 5 | 0.6 |
| | 0.7 | 0.7 | 0.7 | 0.7 | 0.7 | 0.7 | 0.7 | 0.7 | 0.7 | 0.7 | 0.5 |

TABLE 6-continued

| Comparative Example | 1 | 2 | 3 | 4 | 5 | 6 | 7 | 8 | 9 | 10 | 11 |
|---|---|---|---|---|---|---|---|---|---|---|---|
| (A)/(C) | | | | | | | | | | | |
| (4) Xylene Resistance | X | X | ⊚ | ⊚ | ⊚ | ⊚ | ⊚ | ⊚ | ⊚ | ⊚ | X |
| Smoothnes | ⊚ | ⊚ | ⊚ | ⊚ | ⊚ | X | ⊚ | ⊚ | X | ⊚ | ⊚ |
| Transparency of Coating Film | ⊚ | ○ | X | X | ⊚ | ⊚ | ⊚ | X | ⊚ | ⊚ | ⊚ |
| Blocking Resistance | ⊚ | ⊚ | ○ | ○ | X | ⊚ | X | ⊚ | ⊚ | X | ⊚ |
| Glossines | ○ | ○ | ○ | ○ | ○ | ○ | ○ | ○ | ○ | ○ | ○ |

(1) Acrylic Resin (A)
(2) Surface Modifier (B)
(3) Blending Ratio
(4) Evaluation

TABLE 7

| Example | 14 | 15 | 16 | 17 | 18 | 19 |
|---|---|---|---|---|---|---|
| Acrylic Resin (A) | A-1 315 | A-1 315 | A-1 315 | A-1 315 | A-1 315 | A-1 315 |
| Surface Modifier (B) | B-1 2.4 | B-1 2.4 | B-1 2.4 | B-1 2.4 | B-1 2.4 | B-1 2.4 |
| Decane Dicarboxylic Acdi (C) | 80.5 | 80.5 | 80.5 | 80.5 | 80.5 | 80.5 |
| Polysiloxane | 0.5 | 0.5 | 0.5 | 0.5 | 0.5 | 0.5 |
| Benzoin | 1.9 | 1.9 | 1.9 | 1.9 | 1.9 | 1.9 |
| Epoxy Resin | 0 | 14.4 | 14.4 | 14.4 | 0 | 0 |
| Tinuvin 320 | 0 | 2.0 | 2.0 | 0 | 0 | 2.5 |
| Sanol LS770 | 0 | 0 | 0.5 | 0 | 0 | 0.5 |
| Moisture Resistance Test | 40/100 | 100/100 | 100/100 | 100/100 | 100/100 | 100/100 |
| Weathering Test | ○ | ○-Δ | ○ | Δ | ○ | ⊚ |

What is claimed is:

1. A method of coating an aluminum material with a powder coating composition, comprising applying to an aluminum material a powder coating composition comprising:

(A) acrylic resin containing at least 40 percent by weight of a glycidyl-group-containing monomer and having a solubility parameter in the range of 11.0 to 11.6 and a glass transition temperature of at least 20° C.;

(B) a surface modifier consisting of a polymer having a solubility parameter in the range of 10.4 to 11.0; and (C) polyvalent carboxylic acid, wherein said surface modifier is is present in an amount of 0.1 to 4 parts by weight with respect to a total content of 100 parts by weight of said acrylic resin (A) and said polyvalent carboxylic acid (C), and said components (A) and (C) being sufficiently mixed that the amount of carboxyl groups contained in said polyvalent carboxylic acid (C) is at least 0.5 in equivalent ratio to the amount of glycidyl groups in said acrylic resin (A).

2. The method of coating in accordance with claim 1, wherein said powder coating composition further contains epoxy resin in an amount of 0.5 to 5.0 percent by weight with respect to a total content of said acrylic resin (A), said surface modifier (B) and said polyvalent carboxylic acid (C).

3. The method of coating in accordance with claim 1, wherein said powder coating composition further contains an ultraviolet absorbent and/or a hindered amine light stabilizer in an amount of 0.1 to 7 percent by weight with respect to a total content of said acrylic resin (A), said surface modifier (B) and said polyvalent carboxylic acid (C).

4. The method of coating in accordance with claim 1, wherein said acrylic resin (A) comprises 0.1 to 10 percent by weight of i-butyl methacrylate as a monomer component.

5. The method of coating according to claim 1, wherein said acrylic resin (A) comprises 40 to 65 percent by weight of said glycidyl-group-containing monomer.

6. The method of coating in accordance with claim 1, wherein said glass transition temperature of said acrylic resin (A) is 20° to 60° C.

7. The method of coating in accordance with claim 1, wherein said surface modifier (B) has a number average molecular weight of from 2500 to 9000.

8. The method of coating in accordance with claim 1, wherein said glycidyl groups contained in said acrylic resin (A) and said carboxylic groups in said polyvalent carboxylic acid (C) are present in an equivalent ratio of 1:0.6 to 0.8.

* * * * *